INVENTORS
K.L. KIRKPATRICK &
P.R. FERRIS

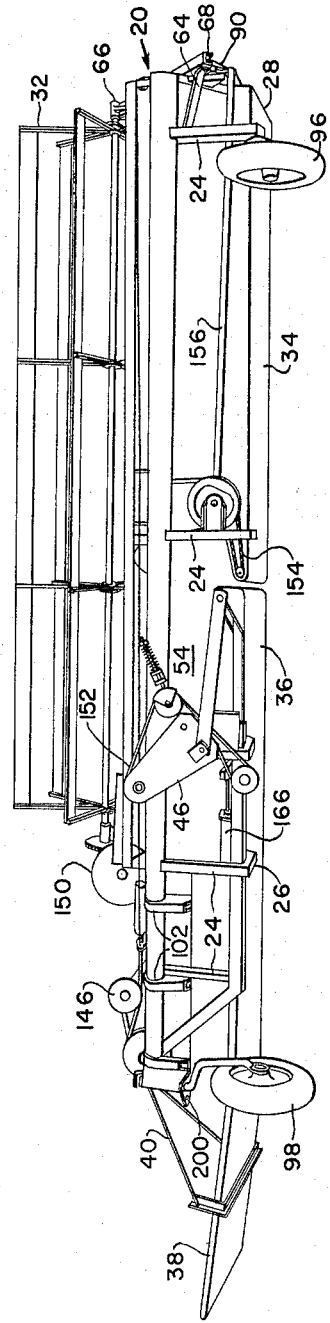
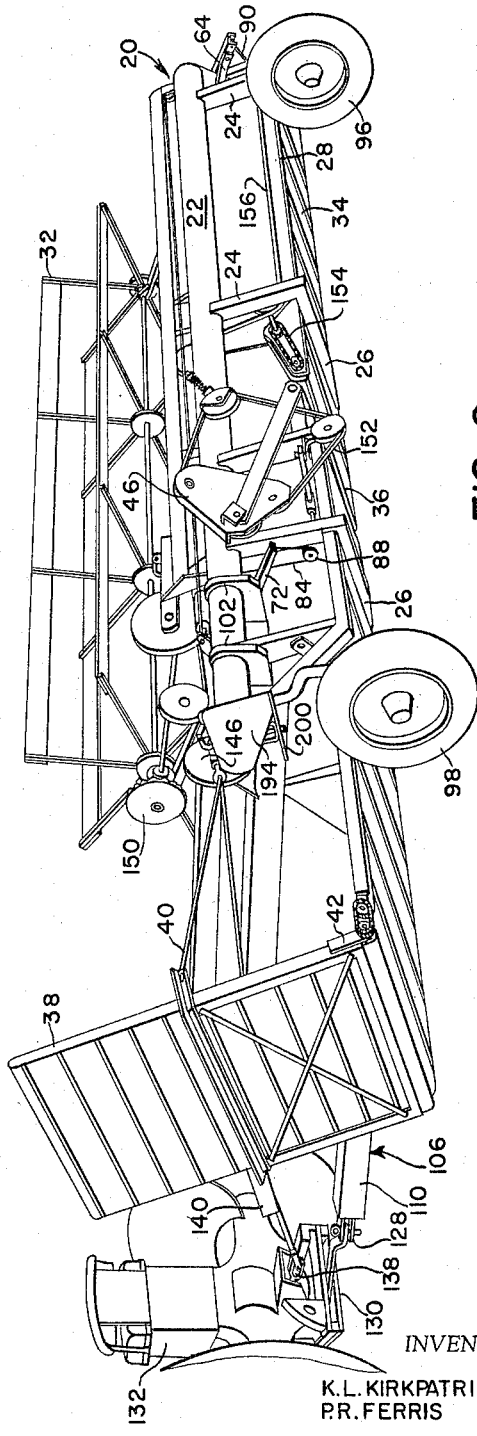

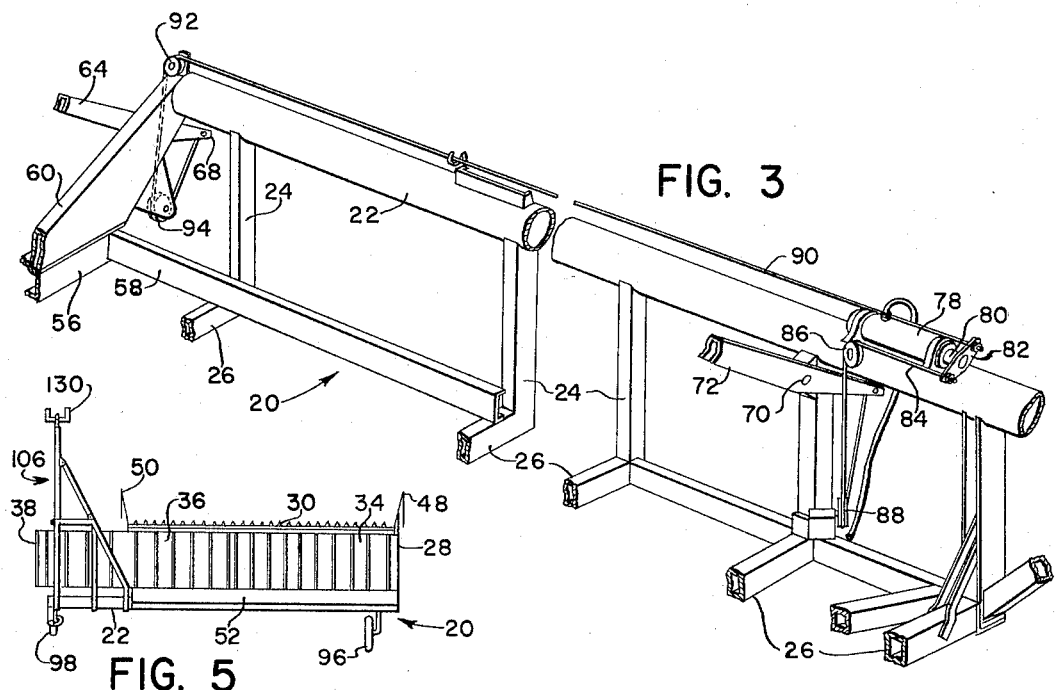
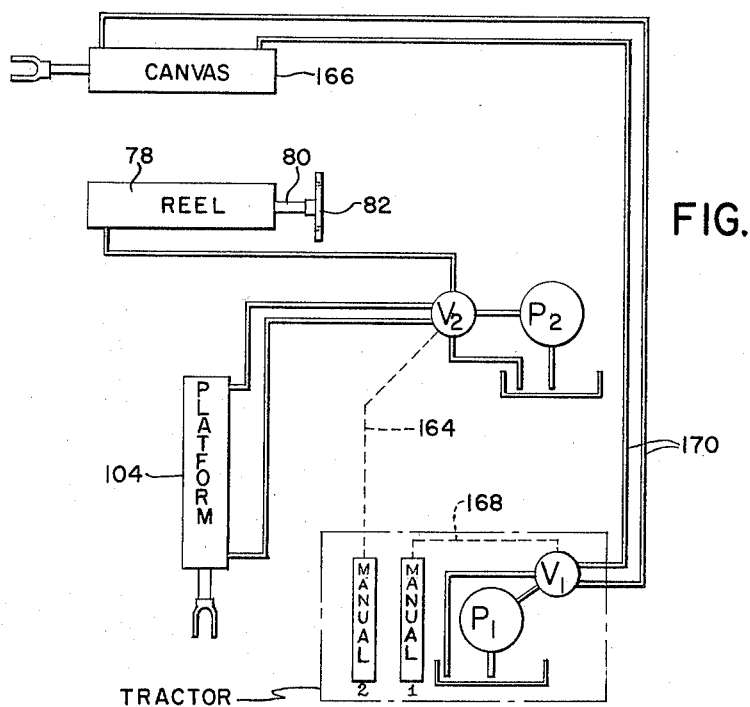

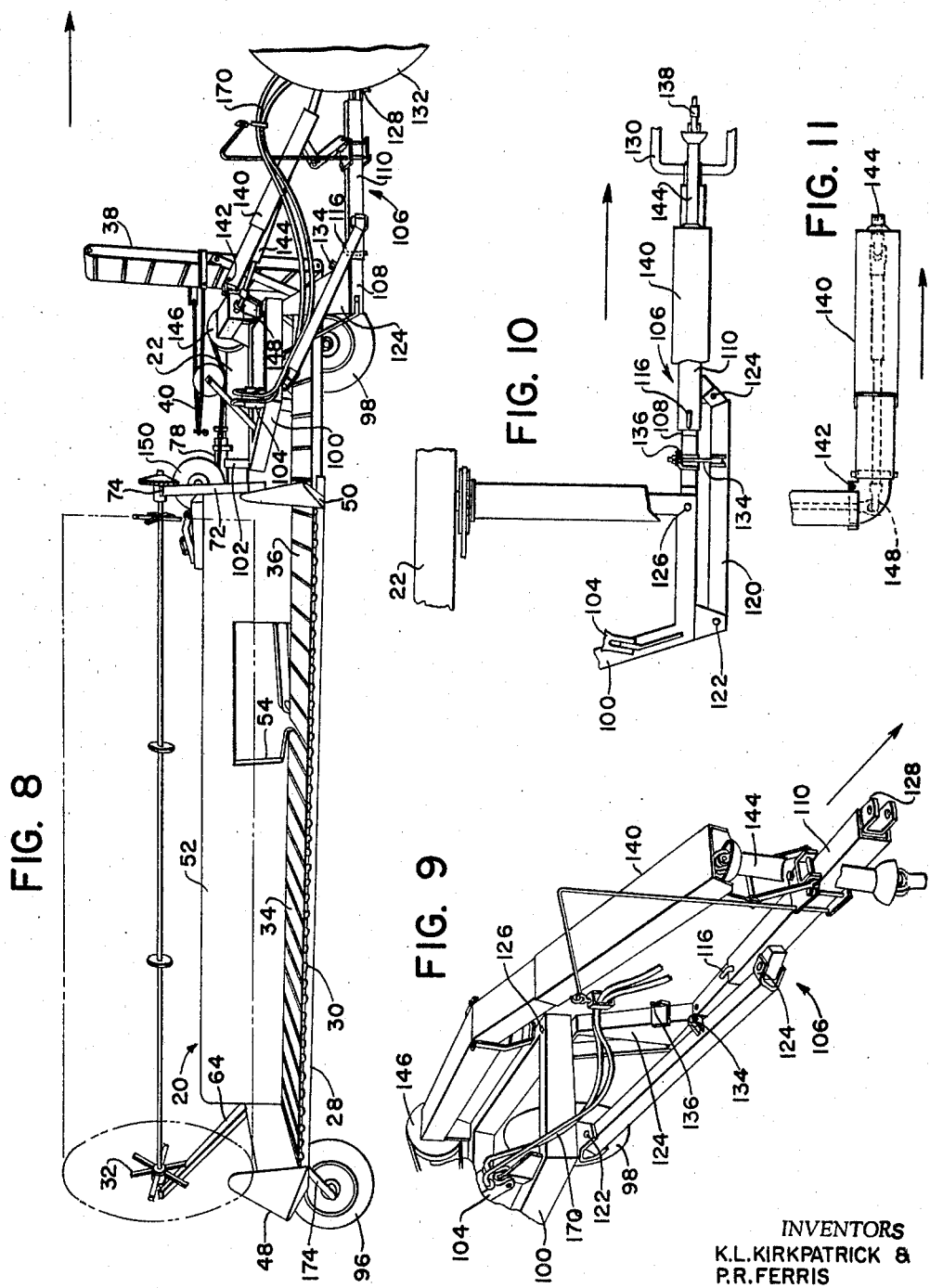

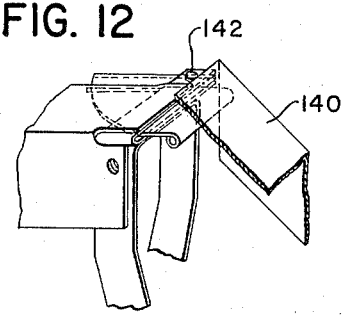
FIG. 12
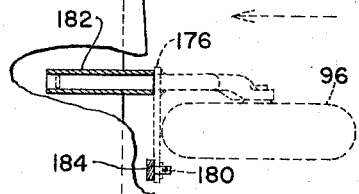
FIG. 14
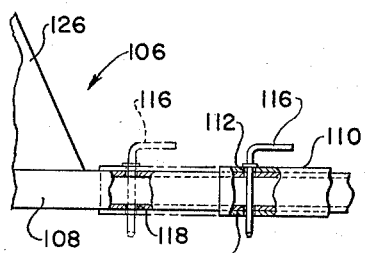
FIG. 13
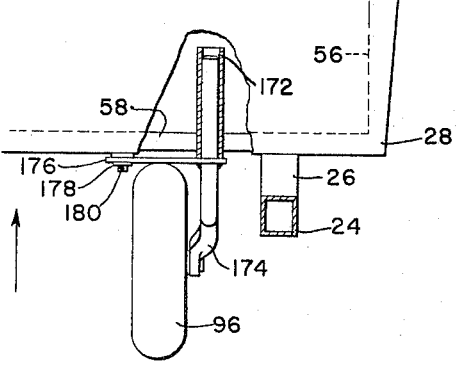
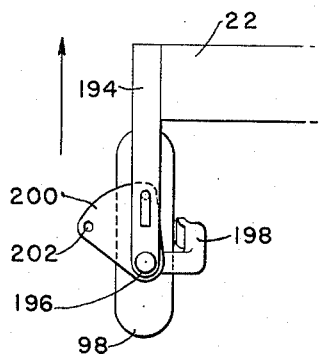
FIG. 15
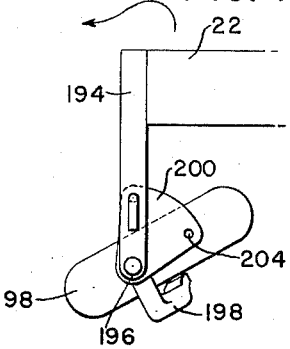
FIG. 16
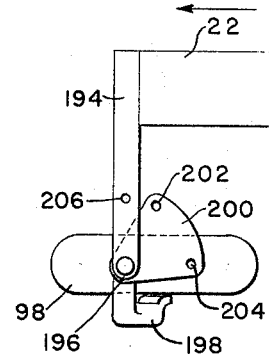
FIG. 17
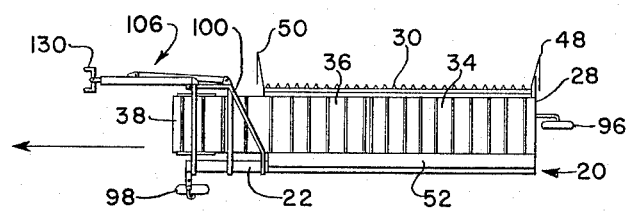
FIG. 18
INVENTORS
K.L. KIRKPATRICK &
P.R. FERRIS United States Patent Office 3,279,158
Patented Oct. 18, 1966

3,279,158
TRANSPORTABLE HARVESTER
Kenneth L. Kirkpatrick, Welland, Ontario, and Paul R. Ferris, Niagara Falls, Ontario, Canada, assignors to Deere & Company, Moline, Ill., a corporation of Delaware
Filed Jan. 23, 1964, Ser. No. 339,664
14 Claims. (Cl. 56—228)

This invention relates to a harvester and more particularly to a harvester of the windrower type which is constructed and supported in such manner that it may be readily drawn by a tractor or like draft vehicle in either an operating or cutting position or a transport position.

As is well-known to those versed in the art, a windrower is a relatively wide machine when considered with respect to its operating or cutting position, because its elongated platform is disposed with its length transverse to the line of advance, and such machines therefore attain widths anywhere from 16 to 22 feet. This makes it virtually impossible to transport the machine without in some way arranging for it to be drawn endwise or with its length parallel to the line of advance. Various solutions to this problem have been offered. One of them is the provision of additional wheels, such as a trailer or the like, for transporting the machine. Another solution is to provide for a rearrangement of the windrower wheels themselves so that they can operate in planes perpendicular to those in which they operate when the machine is in its cutting position. The present invention pertains to improvements in the latter class of means for transporting the windrower.

The invention therefore has for a significant object the provision of improved means for converting the windrower for operation between operating and transport position. More particularly, it is an object to provide the windrower with three basic supporting structures, one of which is the draft tongue and the other two of which are the wheels that support the windrower in cutting position, these three means featuring interchangeability between two positions for accomplishing the two positions of the windrower. It is a further object of the invention to use an adjustable part of the windrower as means for elevating a portion of the windrower so as to remove weight from one of the wheels whereby this wheel may be changed from one position to another, thus facilitating the interchangeability of positions between that wheel. A further object resides in means for controlling the other wheel whereby in one position of the machine it operates as a fixed-direction wheel and in the other position it operates as a caster wheel. Features of the invention also reside in improved draft tongue structure whereby the draft tongue structure may be readily swung between two positions, including a triangular structure in which one of the sides is telescopic, together with releasable locking means for fixing the condition of this structure in either position of the machine.

It is a still further object of the invention to arrange these parts so that the different positions of the machine may be readily achieved merely by releasing a relatively few connections and then relying upon tractor power to cause the machine to change from one position to another.

The foregoing and other important objects and desirable features inherent in and encompassed by the invention will become apparent as a preferred embodiment thereof is disclosed in detail in the ensuing description and accompanying sheets of drawings, the figures of which are described below.

FIG. 1 is a rear perspective view of a windrower of the type convertible between center-delivery and end-delivery.

FIG. 2 is an enlarged three-quarter perspective, largely from the rear, showing the machine in its center-delivery aspect with an outer or left-hand extension conveyor in folded position.

FIG. 3 is a fragmentary perspective, with portions broken away, of the basic framework of the machine, together with means for adjusting the reel for the cutting mechanism.

FIG. 4 is a schematic view of the hydraulic circuits utilized in adjusting and controlling the machine.

FIG. 5 is a relatively small-scale view illustrating generally the position of the machine when cutting or operating.

FIG. 8 is a perspective, generally on the scale of FIG. 1, as seen from the front of the machine when in transport position.

FIG. 9 is an enlarged fragmentary perspective of the draft structure in operating position.

FIG. 10 is a fragmentary plan view showing the draft structure in transport position.

FIG. 11 is a fragmentary view repeating part of FIG. 10 but illustrating portions omitted from FIG. 10.

FIG. 12 is a fragmentary perspective, somewhat enlarged over FIG. 9, illustrating in greater detail the joint between shield structure for the drive.

FIG. 13 is a fragmentary view, enlarged over FIG. 10, illustrating two positions of the telescopic members of the draft structure.

FIG. 14 is an enlarged fragmentary plan view, with portions broken away and other portions in section, illustrating the two positions of the right-hand wheel.

FIG. 15 is a plan view, on the scale of FIG. 14, illustrating one position of the left-hand wheel.

FIG. 16 is a similar view illustrating an intermediate position of the left-hand wheel.

FIG. 17 is a similar view illustrating the transport position of the left-hand wheel.

FIG. 18 is a small scale view, comparable to FIG. 5, illustrating the machine as seen in plan when in its transport position.

Figure 6:
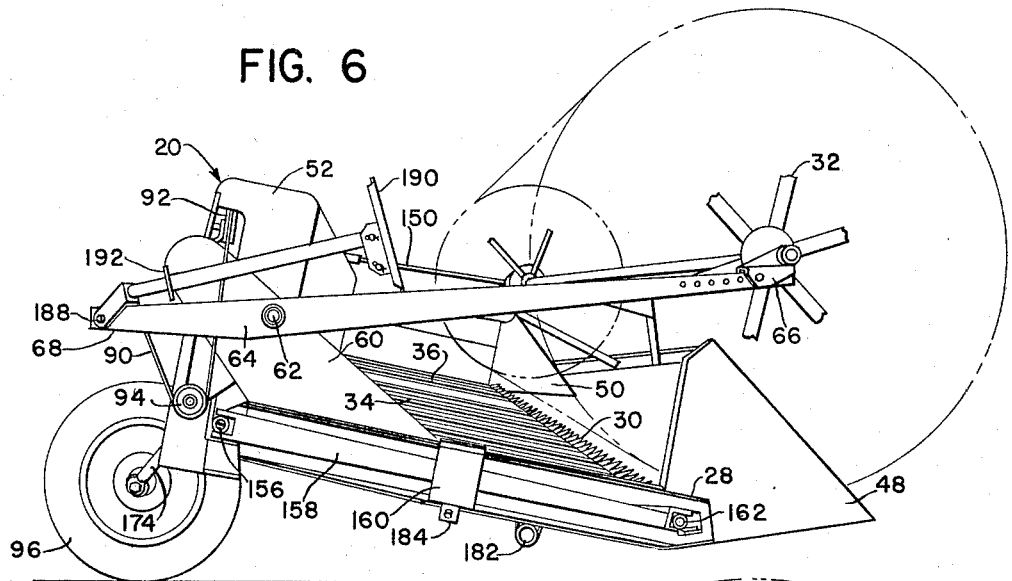
FIG. 6 is an enlarged perspective as seen from the right-hand end of the machine, illustrating the right-hand wheel in operating position.

The windrower chosen for purposes of illustration includes a main frame 20 made up primarily of an elongated tubular rear upper member 22 to which are rigidly secured a plurality of transversely spaced L-shaped members 24, the lower portions 26 of which extend forwardly to support the windrower platform 28.

When the windrower is considered as functioning in its operating or cutting position, the elongated frame or platform is of course disposed transverse to the line of advance, and the forward or leading edge of the platform may be conventionally provided with cutting mechanism 30, over which a reel 32 typically operates to cause the standing crop to be cut and directed rearwardly over the cutting mechanism to a pair of conveyors 34 and 36. The particular machine shown here is of the type in which the conveyor 36 is shiftable lengthwise of the platform between the position of FIG. 1 and that of FIG. 2, the difference being that in FIG. 1 the termial inner ends of the conveyors 34 and 36 are in substantially abutting relationship and the upper surfaces of both conveyors run to the left for discharge of the crop over an extension conveyor 38 which also operates to its left so that the windrow is formed at the left-hand end of the machine.

In the condition of the conveyors in FIG. 2, the conveyor 36 has been shifted to the left so as to leave a gap or discharge opening between the terminal ends of the two conveyors. At the same time, the extension conveyor 38 has been moved to a folded position in which it is retained by supporting links 40. Simultaneously, the direction of travel of the upper surface of the conveyor 36 has been reversed so that it moves inwardly. The direction of travel of the upper surface of the conveyor 34 remains the same—that is, inwardly—and therefore both conveyors discharge at the discharge opening so that the machine is convertible to a center-delivery type. This much of the structure forms the subject matter of U.S. Patent No. 3,214,002. The links 40 are also instrumental in supporting the extension conveyor in a substantially horizontal position as shown in FIG. 1, the inner or lower end of the extension conveyor being appropriately connected to the left-hand end of the conveyor 36, as at 42, and the links being connected to the main frame member 42 at 44 so that as the conveyor 36 slides inwardly and outwardly the extension conveyor follows it and pivots about the point 44. The mechanism for reversing the drive to the conveyor 36 is illustrated in part at 46 and, as just stated, is described only briefly merely because it is illustrated as part of the particular machine chosen for the present disclosure.

The cutting mechanism 30 is delineated at opposite ends by right- and left-hand dividers 48 and 50, which also delineates the length of the reel 32, portions of which have been omitted in some of the views because the general structure and relationship are well-known.

The main frame includes certain portions in the form of shielding, a part of which, as at 52, overlies the main beam or tube 22, this part being carried downwardly at the back of the platform and formed to provide a rear opening 54, the foregoing being offered merely as an explanation of the apparent differences in the appearance of the machine as seen from front, rear, etc. Also, at this point, it should be noted that the expressions "right," "left" etc., are used with reference to the operating position of the machine which in turn is based on conventional practice of windrowing either to the center or to the left.

Figure 7:
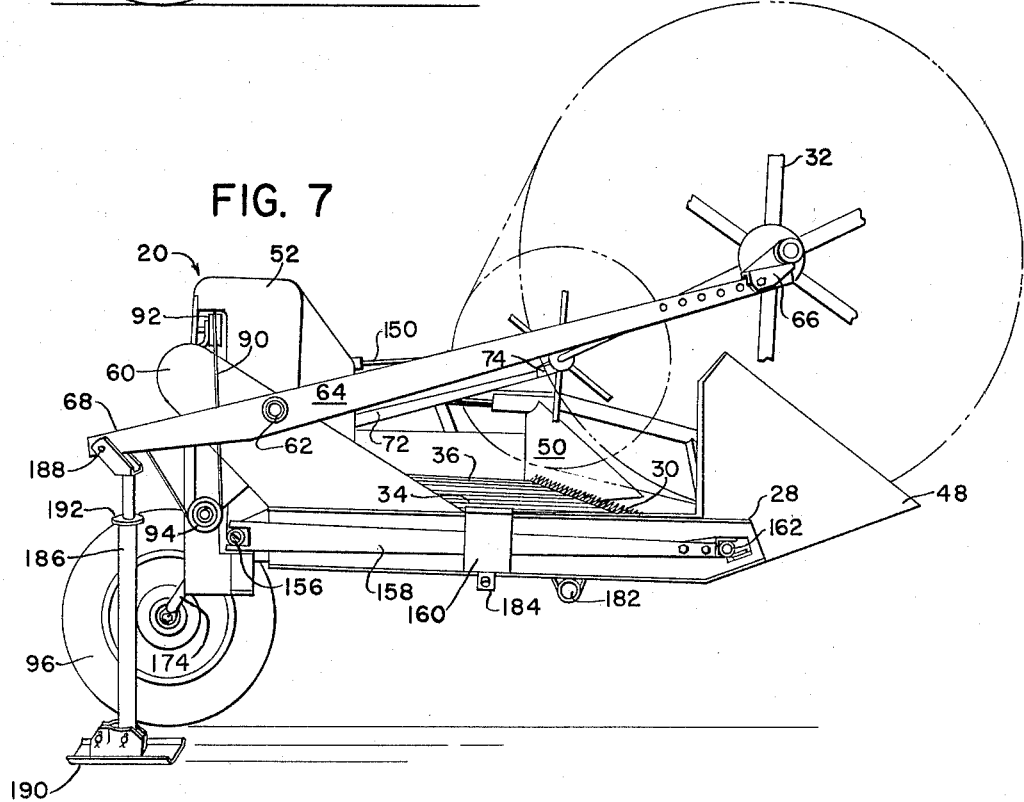
FIG. 7 is a similar view but showing the use of the reel adjusting means in elevating the frame as an incident to changing the position of the right-hand wheel.

Additional structure of the machine includes framework for the platform 28, represented in part by a right-hand fore-and-aft member 56 and an elongated rear member 58 (FIG. 14) together with a diagonal right-hand end member 60 (FIGS. 6 and 7).

The diagonal member 60 provides a pivot 62 for a fore-and-aft right-hand reel support arm 64, the forward end of which is connected at 66 to the proximate or right-hand end of the reel 32, and the rear end of which projects at 68 rearwardly of the tubular member 22. Adjacent to the left-hand end of the frame 20, a bracket affords a pivot 70 for a left-hand fore-and-aft reel support arm 72, the forward end of which is connected at 74 to the left-hand end of the reel 32 and the rear end of which projects rearwardly at 76 to a point rearwardly of the tubular member 22 (FIG. 3). The pivots 70 and 62 are alined on an axis that is parallel to the length of the frame and the reel arms 72 and 64 are vertically swingable in unison about these pivots to adjust the vertical relationship of the reel 32 to the cutting mechanism 30. The reel thus represents in general an adjustable part of the windrower.

The means for adjusting the reel is power-operated, including in this instance a hydraulic motor or ram 78 rigidly mounted on the tubular member 22 adjacent to the left-hand reel arm 72 and having extending therefrom a piston rod 80 to which is rigidly connected a cross member 82. One end of the cross member is connected by a cable 84 which is trained over a tube-mounted sheave 86 and thence around a frame-mounted lower sheave 88 and backup to the rear end 76 of the arm 72. The other end of the cross member 82 is connected by a cable 90 which extends to the right along the tube 22 and is trained over a tube-mounted sheave 92, thence downwardly around a lower sheave 94 and upwardly to the rear end 68 of the right-hand reel arm 64. As seen in FIG. 3, the lower sheave 94 is appropriately mounted on the diagonal member 60. From this description, it will be seen that when the ram is extended—moving the piston rod 80 and cross member 82 to the left (to the right as seen in FIG. 3)—the cables 84 and 90 are tensioned, thus drawing downwardly on the rear ends of the two reel arms 64 and 70 and therefore raising the reel 32 relative to the cutting mechanism 30. When the reel cylinder 78 is retracted, the reel will descend by gravity to a position selected by controlling the hydraulic circuit to the cylinder. This circuit is shown in FIG. 4 in conjunction with other mechanisms which will be described later.

Considered in its cutting or operating position, the machine is carried at its right- and left-hand ends respectively by right- and left-hand supporting wheels 96 and 98, the details of the respective mountings of which will be discussed subsequently. Adjacent to its left-hand end and extending forwardly therefrom, the main frame includes a draft frame 100, having a pivotal connection to the main frame as by a pair of coaxial straps 102 (FIGS. 1, 2 and 8) rockable about the axis of the tube so that the draft frame 100 is vertically swingable relative to the main frame. A two-way hydraulic cylinder 104 is connected between the main frame and the draft frame 100 and extension and retraction thereof raises and lowers the platform relative to the ground, a general type of adjustment which is not unknown in the art. When fluid is hydraulically locked in the circuit including the cylinder 104, the draft frame 100 is rigidified relative to the main frame and in effect becomes a supporting part thereof, together with draft tongue structure indicated in its entirety by the numeral 106.

This structure comprises a pair of members 108 and 110, slidably or telescopically interconnected and capable of being retained in either of two positions as shown in FIG. 13. The member 108 is a rigid part of the draft frame 100 and the part or member 110 is preferably tubular and is slidable on the member 108. The member 110 has therein a pair of vertically alined apertures 112 which are registrable with a first set of apertures 114 in the member 108, the alined apertures receiving a locking pin 116 which serves as releasable means. Rearwardly of the set of apertures 114, the member 108 has a second set of apertures 118. When the member 110 is moved rearwardly so that its apertures 112 line up with the second set of apertures 118, the pin 116 may be placed in that position. When the two members 108 and 110 are relatively extended—with the pin 116 in the front set of apertures, the two members extend forwardly substantially at right angles to the main frame, and this is the operating condition of the draft tongue, which is maintained by a diagonal brace 120 having pivotal connections 122 and 124 at opposite ends respectively to the draft frame 100 and the front draft tongue member 110.

The rear portion of the member 108 has rigidly secured thereto an upstanding part 126 which, although rigid with the draft frame structure in a vertical direction, is pivotal thereto in a horizontal direction as by means of upper and lower pivot pins 126, only the upper one of which is visible (FIGS. 9 and 10). When the locking pin 116 is in either of its positions, the draft tongue structure is rigidified relative to the draft frame and consequently relative to the main frame so long as the platform adjusting cylinder 104 is hydraulically locked. The forward draft tongue part 110 has a clevis 128 by means of which it may be connected to the drawbar 130 of an agricultural tractor 132, which may be of any conventional construction.

FIG. 9 shows the relationship of the draft frame and draft tongue structure to each other when the machine is in its operating condition. In this case, the pin 116 is in the forward set of apertures and therefore locks the two draft tongue members 108 and 110 against telescoping. The brace 120, extending diagonally between the pivotal connection 124 with the member 110 and the pivotal connection 122 with the draft frame structure 100 prevents lateral swinging of the entire draft tongue structure 106, it being noted that the pivots 122 and 124 are sufficiently close to vertical axes to enable swinging of the structure 106 when the pin 116 is released. FIG. 10 shows swinging of the structure 106 to its transport position, in which case the pin 116 has been removed so that the two members 108 and 110 may telescope to a relatively shorter condition, after which the pin 116 is replaced (dotted lines FIG. 13). Since the triangular structure made up by the members 108–110, brace 120 and transverse portion of the draft frame 110 has now been temporarily disestablished by release of the pin 116, the structure can fold between the operating position of FIG. 9 and the transport position of FIG. 10, in which latter position is of course locked by the pin 116 which prevents telescoping of the members 108 and 110, and in addition a second releasable lock is provided by means of an eye-bolt 134 on the brace 120 and a notched part 136 rigid on the structure 124 which, as pointed out above, is part of the draft tongue member 108. The disconnected status of the parts 134 and 136 appears in FIG. 9. The connected status appears in FIG. 10, wherein it will be seen that the eye-bolt spans the short distance between the brace 120 and the portion 126 on the member 108. The combination of the two releasable locking means 116 and 134–136 rigidifies the draft tongue structure in the operating condition.

The tractor 132, as is typical of agricultural tractors, is provided with a rear power take-off shaft 138 which is used to drive the drivable parts of the windrower. Telescopic and articulated shielding 140 is carried in part by the draft tongue structure 106 and in part by the draft frame 100. The connection between the forward and rearward parts of the shielding, which permits pivoting, as well as relative vertical movement is illustrated at 142 in FIG. 12, as well as in FIG. 11. In FIG. 10, portions of the shielding have been omitted so as to expose other structure. In FIG. 11, underlying structure has been omitted to illustrate the shielding. The power line from the tractor power take-off shaft 138 is visible in large part in FIGS. 9 and 11 as including a propeller shaft 144 which ultimately reaches a driving sheave 146 at the left-hand rear portion of the windrower. This power line is universally jointed at 148 in the area of the shielding joint 142 and draft tongue pivot 126 (FIGS. 8 and 11).

As best seen in FIGS. 1 and 2, the drive from the sheave 146 ultimately reaches the reel, as at 150, the left-hand conveyor, as at 152, the drive for the right-hand conveyor 34, as at 154, as well as for a pitman 156 which ultimately reaches the cutting mechanism via a rocking beam 158 at the right-hand end of the frame, this beam being pivoted to the platform at 160 and being connected to the cutting mechanism at 162 (FIGS. 6 and 7).

The drive from the tractor ultimately reaches and drives a hydraulic pump P2 on the windrower (FIG. 4) and this pump in turn furnishes hydraulic pressure for extending and retracting the reel adjusting ram 78 and the platform adjusting ram 104 by means of a valve V2 which has a mechanical connection, as indicated by the broken line 164 in FIG. 4 to a manual control on the tractor. Any suitable arrangement may be utilized in this respect and the details are not material in the present case. The tractor hydraulic system which includes a pump P1 and a control valve V1, is utilized to control the extension and retraction of a canvas or conveyor ram 166, the purpose of which is to selectively shift the left-hand conveyor 36 toward and away from the right-hand conveyor 34. The broken line 168 in FIG. 4 represents a mechanical connection between the valve V1 and the manual control therefor. The manual controls for the two valves V1 and V2 may of course be conveniently grouped on the tractor for ready access by the tractor operator. The fluid lines from the tractor to the motor 104 are clearly visible at 170 in FIGS. 8 and 9.

The mounting for the right-hand wheel 96, by means of which the wheel may be changed between two positions, is best shown in FIG. 14. The framework 58 at the rear of the platform 28 is provided with a fore-and-aft socket means in the form of a tube 172 rigidly attached to the frame in any appropriate manner, as by welding. The wheel 96 is mounted on a short axle which itself is rigidly secured to an arm 174 which is forwardly insertible into and receivable by the tube or socket means 172 in the operating position of the machine. A bar 176 is rigidly secured to the arm 174 and extends normal thereto and is received by a fastener part 178 and is pinned in place. Thus, the arm 174 is held against both rearward withdrawal from the socket means 172, as well as against rotation about the fore-and-aft axis of the arm. The arm 174 is appropriately shaped so as to incline upwardly and is then bent forwardly to provide the portion that is receivable in the socket means 172.

When it is desired to remove the wheel 96 to change it to its supporting position for use when the windrower is transported, it is necessary only to remove the pin 180 and to withdraw the arm 174 from the socket means 172, after elevating the right-hand end of the platform (in a manner to be presently described), following which the arm 174 is inserted in a second and similar socket means 182 which is rigidly carried at the right-hand end of the platform by the framework 56, the axis of the tube 182 in this case extending parallel to the length of the platform. This socket means or tube is located approximately midway between the front and rear longitudinal edges of the platform so that the wheel 96 is disposed centrally in a trailing relation to the machine when it is transported with its left-hand end forward (FIGS. 8 and 18). In addition to the socket means 182, the edge 56 of the platform carries a fastener part 184 with which the terminal end of the bar 176 is cooperative. The pin 180 is again used to lock the parts in place.

For the purpose of elevating the right-hand end of the platform so as to facilitate changing of the wheel 96 between its two positions (FIG. 14), force from an adjustable part of the machine is utilized. In this case, the reel adjusting means operates to exert a force capable of raising the right-hand end of the platform. A manually extendable jack 186 is pivotally carried at one end at 188 on the rear end 68 of the right-hand reel-adjusting arm 64. The jack has at its other end a ground-engaging shoe 190. Extension and retraction of the jack is accomplished by releasing and locking of the telescopic parts of the jack by means of a typical locking washer 192, a construction not unknown to those versed in the art. The jack is swingable between a storage position (FIG. 6) and an active position (FIG. 7). When in its active position, the jack acts as a column or compression member between the rear end 68 of the reel arm 64 and the ground, so that when a force is exerted by the reel adjusting ram 78 to rock the reel arm 64 in a counterclockwise direction, the connection at 188 becomes a fulcrum and the connection 62 between the platform and the arm 64 moves upwardly, raising the platform with it. The purpose of the adjustability of the jack 186 is to enable it to accommodate different heights of the rear end 68 of the reel arm 64 with respect to the ground. When the platform is raised, it is a simple matter to change the wheel 96 from the fore-and-aft socket means 172 to the lateral socket means 182.

The mounting for the left-hand wheel 98 is best shown in FIGS. 15, 16 and 17. Extending rearwardly from the left-hand end of the tubular frame member 22 is a wheel-mounting bracket 194, the rear end of which affords a bearing or pivot 196 on an upright axis which rotatably receives a standard 198 which in turn has at its lower end an axle on which the wheel 98 is mounted. The upper end of the standard 198 has rigidly secured thereto a plate 200 in which is provided two apertures 202 and 204. This plate closely underlies a portion of the mounting bracket 194 which has therein an aperture 206. When the machine is operating in its cutting position, the position of the wheel 98 is fixed so that it rotates in a fore-and-aft plane, the means for retaining this position comprising a releasable locking device in the form of a pin 208 which is inserted downwardly through the alined aperture 204 in the plate 200 and the aperture 206 in the bracket 194. This makes the wheel 98, like the wheel 96, a fixed-direction wheel. The axes about which the respective wheels rotate are substantially coaxial on a line parallel to the length of the platform 28. The machine is thus, in cutting position, supported at three points; namely, the wheels 96 and 98 and the draft tongue structure 106, it being recalled that in normal operation the platform ram 104 is hydraulically locked. The connection between the draft tongue structure 106 and the tractor is of course pivotal at the clevis 128 so as to accommodate relative turning movement of the tractor, as well as vertical variations due to differences in ground contour.

When it is desired to change the machine from cutting position to transport position, only three simple steps are involved; viz., relocation of the wheel 96 from its full-line position of FIG. 14 to its dotted-line position; releasing of the wheel 98 so that it is free to caster; and swinging of the drawbar structure 106 90° to the left so that it becomes a leftward extension of the machine. The ultimate result or transport position of the machine is shown in FIG. 18, as well as in FIG. 8.

The specific procedure is as follows. The jack stand or column 186 is swung from its storage position to its active position, adjusted to accommodate any irregularities in the ground or differences in height between the ground and the reel arm, and the reel adjusting ram is extended to apply a lifting force to the reel. As aforesaid, this is converted into a raising force to elevate the right-hand end of the platform. The wheel 96 is then relocated to the dotted-line position of FIG. 14 (full lines in FIGS. 8 and 18) and the reel ram retracted to lower the platform so that the right-hand end is supported on the wheel 96 in its new position.

The draft tongue structure is then released by removing the pin 116 from its locking position between the telescopic members 108 and 110. The tractor operator then drives ahead quickly, causing the machine to roll forward on its left-hand wheel 98, the right-hand wheel acting somewhat as a pivot. This causes the drawbar structure 106 to swing outwardly or to the left, the members 108 and 110 telescoping or shortening so that the positions of FIGS. 8, 10 and 18 are achieved. The pin 116 is then relocated in the second set of holes (dotted lines FIG. 13) and the eye-bolt 134 is swung across to interlock the brace 120 to the structure 106 (FIG. 10).

The locking pin 208 for the wheel 98 is then removed, which frees the wheel 98 to act as a caster wheel. This pin may be stored in any suitable location on the machine. As will be obvious, the machine in its transport position is elongated in the direction of travel and is therefore narrowed in the direction transverse to the line of travel, which is a 90° difference from its character when operating in its cutting position.

Restoring the machine from its transport position to its cutting position is basically a reversal of the above procedure, with some modifications to assist in swinging the drawbar back to its straight-ahead position as respects the cutting position. The operator drives the tractor and connected machine forwardly until the wheel 98 (which is now a caster wheel, of course) assumes the angle shown in FIG. 16. The pin 208 is utilized in this case to lock the wheel 98 in this position, the hole 202 in the plate 200 being alined with the hole 206 in the bracket 194. The releasable means on the draft tongue structure are removed or released. The tractor is then driven forwardly and braked. Because the wheel 98 is now locked in its angled position, the machine moves to the left relative to the tractor and the draft tongue structure swings 90° to the right. If this does not result immediately, because of ground conditions and the like, backing the tractor, once the drawbar is started to the right, will finish the job. The drawbar pin 116 is then restored to its forward location (full lines FIG. 13). The machine is then backed until the wheel 98 achieves the position of FIG. 15, following which it is pinned in place by the pin 208 so that its plane of rotation is again fore-and-aft as respects the cutting position. The right-hand end of the machine is raised by the reel adjusting mechanism as previously described and the wheel 96 is returned to its full-line position of FIG. 14. The right-hand end of the platform then lowered, the jack stand is returned to its storage position (FIG. 6) and the machine is thus prepared for operation.

It will be seen from the foregoing that the objects and features of the invention are readily attained in a relatively uncomplicated manner. Features and objects other than those enumerated herein will readily occur to those versed in the art, as will many modifications and alterations in the preferred embodiment disclosed, all of which may be achieved without departure from the spirit and scope of the invention.

What is claimed is:

1. In a harvester having an elongated frame including cutting mechanism and a vertically adjustable reel support means and operative in a cutting position with its length transverse to the line of advance and supported at its left-hand end by a draft tongue extending forwardly to and for support on a tractor and by a left-hand fixed-direction wheel rearwardly of the tongue and supported at its right-hand end by a right-hand fixed-direction wheel rearwardly of the frame, the improvement residing in means for arranging the harvester for travel in a transport position with its length along the line of travel and said left-hand end forward, comprising: means mounting the draft tongue for repositioning to extend leftwardly from and beyond said left-hand end of the frame; means mounting the left-hand wheel for conversion to a caster wheel; means acting between the reel support means and the ground for raising the right-hand end of the frame to relieve the right-hand wheel of the weight of the frame; and means mounting the right-hand wheel for removal from its aforesaid position and for remounting at the right-hand end of the frame as a fixed-direction wheel to rotate in a plane lengthwise of the platform.

2. The invention defined in claim 1, in which: the draft tongue comprises a triangular structure having one apex portion connected to the tractor, two other apex portions connected to the frame on substantially upright pivots, one side of said structure, other than the frame, including relatively telescopic, releasably interconnected members enabling selective positioning of said structure to extend either forwardly or leftwardly.

3. The invention defined in claim 1, in which: the means mounting the right-hand wheel includes first socket means on the frame extending fore-and aft and opening at the rear of the frame when the frame is in its cutting position, and second similar socket means on the frame and extending lengthwise thereof and opening at said right-hand end, and the right-hand wheel includes a part selectively receivable in either of said socket means.

4. The invention defined in claim 3, in which: the reel support means includes a vertically swingable arm mounted on the frame and carrying the reel, and the means acting to raise the right end of the platform includes a compression member engageable between said arm and the ground and on which vertical movement of the arm in one direction acts to raise the frame.

5. The invention defined in claim 4, in which: the harvester includes tractor-powered means acting on and for swinging said arm.

6. The invention defined in claim 1, in which: the mounting means for the left-hand wheel includes a support providing a bearing on an upright axis, a member carrying said left-hand wheel and journaled in said bearing and releasable means lockable and releasable between the support and said member when the harvester is respectively in its cutting and transport positions.

7. In a harvester having an elongated frame including cutting mechanism and a vertically adjustable reel support means and operative in a cutting position with its length transverse to the line of advance and supported at its left-hand end by a draft tongue extending forwardly to and for support on a tractor and by a left-hand fixed-direction wheel rearwardly of the tongue and supported at its right-hand end by a right-hand wheel rearwardly of the frame and rotatable in a plane parallel to the line of travel, the improvement residing in means for arranging the harvester for travel in a transport position with its length along the line of travel and said left-hand end forward, comprising: means mounting the draft tongue for repositioning to extend leftwardly from and beyond said left-hand end of the frame; means mounting the left-hand wheel for rotation in a plane parallel to the length of the platform; means acting between the reel support means and the ground for raising the right-hand end of the frame to relieve the right-hand wheel of the weight of the frame; and means mounting the right-hand wheel for change from its aforesaid plane of rotation to a plane of rotation lengthwise of the platform.

8. In a harvester having an elongated frame including cutting mechanism and operative in a cutting position with its length transverse to the line of advance and supported at its left-hand end by a draft tongue extending forwardly to and for support on a tractor and by a left-hand fixed-direction wheel rearwardly of the tongue and supported at its right-hand end by a right-hand fixed-direction wheel rearwardly of the frame, the improvement residing in means for arranging the harvester for travel in a transport position with its length along the line of travel and said left-hand end forward, comprising: means mounting the left tongue for repositioning to extend leftwardly from and beyond said left-hand end of the frame; means mounting the left-hand wheel for conversion to a caster wheel; and means mounting the right-hand wheel for removal from its aforesaid position and for remounting at the right-hand end of the frame as a fixed-direction wheel to rotate in a plane lengthwise of the platform.

9. In a harvester having an elongated frame including cutting mechanism and a vertically adjustable part and operative in a cutting position with its length transverse to the line of advance and supported at its left-hand end by a draft tongue extending forwardly to and for support on a tractor and by a left-hand fixed-direction wheel rearwardly of the tongue and supported at its right-hand end by a right-hand fixed-direction wheel rearwardly of the frame, the improvement residing in means for arranging the harvester for travel in a transport position with its length along the line of travel and said left-hand end forward, comprising: means mounting the draft tongue for repositioning to extend leftwardly from and beyond said left-hand end of the frame; means mounting the left-hand wheel for conversion to a caster wheel; means acting between the adjustable part and the ground for raising the right-hand end of the frame to relieve the right-hand wheel of the weight of the frame; and means mounting the right-hand wheel for removal from its aforesaid position and for remounting at the right-hand end of the frame as a fixed-direction wheel to rotate in a plane lengthwise of the platform.

10. In a harvester having an elongated main frame including forward cutting mechanism and first and second opposite ends and a reel operative over the cutting mechanism, the improvement comprising: first and second fore-and-aft reel support arms disposed respectively at said first and second ends of the frame, each arm being pivoted intermediate its ends on the frame on an axis parallel to the length of the frame and each arm being connected at its forward end to the proximate end of the reel; adjusting means carried by the frame and operatively connected to the rear ends of said arms for swinging the arms to adjust the reel; first and second supporting wheels respectively adjacent to said frame ends; first and second means mounting the wheels despectively on the frame, said first mounting means being disconnectible to enable removal of its wheel; and a support connected to the rear end of the first arm and movable from an inactive position clear of the ground to an operative position engaging the ground and acting as a column between the ground and said rear end of said arm whereby swinging of said arm to move said rear end downwardly operates to raise said first end of the frame.

11. The invention defined in claim 10 in which: said support is vertically adjustable.

12. The invention defined in claim 10, in which: said support is connected to said first arm rear end by a pivot enabling swinging of said support to a storage position lying alongside said first arm.

13. In a harvester having an elongated main frame including forward cutting mechanism and first and second opposite ends and a reel operative over the cutting mechanism, the improvement comprising: first and second fore-and-aft reel support arms disposed respectively at said first and second ends of the frame, each arm being pivoted on the frame on an axis parallel to the length of the frame and each arm being connected to the proximate end of the reel; adjusting means carried by the frame and operatively connected to the arms for swinging the arms to adjust the reel; first and second supporting wheels respectively adjacent to said frame ends; first and second means mounting the wheels respectively on the frame, said first mounting means being disconnectible to enable removal of its wheel; and a support connected to the first arm and movable from an inactive position clear of the ground to an operative position engaging the ground and acting as a column between the ground and said arm whereby swinging of said arm in one direction operates to raise said first end of the frame.

14. The invention defined in claim 13 in which: said support is vertically adjustable.

References Cited by the Examiner

UNITED STATES PATENTS

| | | | |
|---|---|---|---|
| 2,530,668 | 11/1950 | Tallman | 56—218 XR |
| 2,532,164 | 11/1950 | Hansen et al. | 56—228 XR |
| 2,672,721 | 3/1954 | Adams | 56—228 XR |
| 2,836,952 | 6/1958 | Hume | 56—228 XR |
| 3,086,605 | 4/1963 | Walker | 280—150 XR |
| 3,142,144 | 7/1964 | Ronning | 56—228 |

ABRAHAM G. STONE, *Primary Examiner.*

ANTONIO F. GUIDA, *Examiner.*

UNITED STATES PATENT OFFICE
CERTIFICATE OF CORRECTION

Patent No. 3,279,158                      October 18, 1966

Kenneth L. Kirkpatrick et al.

It is hereby certified that error appears in the above numbered patent requiring correction and that the said Letters Patent should read as corrected below.

Column 9, line 37, for "left", first occurrence, read -- draft --; column 10, line 14, for "despectively" read -- respectively --.

Signed and sealed this 5th day of September 1967.

(SEAL)
Attest:

ERNEST W. SWIDER                      EDWARD J. BRENNER
Attesting Officer                      Commissioner of Patents